United States Patent
Kaplan

(10) Patent No.: US 10,094,999 B2
(45) Date of Patent: Oct. 9, 2018

(54) FIELD INSTALLABLE CABLE TERMINATION SYSTEM AND METHOD

(71) Applicant: Multilink Inc., Elyria, OH (US)

(72) Inventor: Steve E. Kaplan, Elyria, OH (US)

(73) Assignee: Multilink Inc., Elyria, OH (US)

( * ) Notice: Subject to any disclaimer, the term of this patent is extended or adjusted under 35 U.S.C. 154(b) by 0 days.

(21) Appl. No.: 15/475,217

(22) Filed: Mar. 31, 2017

(65) Prior Publication Data

US 2017/0285290 A1   Oct. 5, 2017

Related U.S. Application Data

(60) Provisional application No. 62/317,021, filed on Apr. 1, 2016.

(51) Int. Cl.
*G02B 6/36* (2006.01)
*G02B 6/44* (2006.01)
*G02B 6/38* (2006.01)

(52) U.S. Cl.
CPC ......... *G02B 6/4471* (2013.01); *G02B 6/3887* (2013.01); *G02B 6/3893* (2013.01); *G02B 6/3894* (2013.01); *G02B 6/3897* (2013.01); *G02B 6/4446* (2013.01); *G02B 6/4452* (2013.01)

(58) Field of Classification Search
CPC .. G02B 6/3885; G02B 6/3893; G02B 6/3887; G02B 6/3825; G02B 6/36; G02B 6/3821
See application file for complete search history.

(56) References Cited

U.S. PATENT DOCUMENTS

| | | |
|---|---|---|
| 5,287,425 A | 2/1994 | Chang |
| 5,428,703 A | 6/1995 | Lee |
| 7,090,406 B2 | 8/2006 | Melton et al. |
| 7,794,155 B1 * | 9/2010 | Haley .................. G02B 6/3879 385/139 |
| 8,931,963 B2 | 1/2015 | Scopic et al. |
| 2014/0241670 A1 | 8/2014 | Barnette, Jr. et al. |

OTHER PUBLICATIONS

"Fiber Optic ConnectorTutorial", http://www.fiberoptics4sale.com/Merchant2/fiber-optic-connectors.php, (no date given, but printed from internet on Dec. 4, 2015), 14 pages.

* cited by examiner

*Primary Examiner* — Jennifer Doan
(74) *Attorney, Agent, or Firm* — Renner, Otto, Boisselle & Sklar, LLP

(57) ABSTRACT

A termination for a fiber optic cable, includes an optical connector for a fiber optic member, a collar having a hollow interior in which at least part of the optical connector is positionable, and a retaining clip positionable with respect to the collar at a location to block exiting of the optical connector from the collar. A stop in the collar limits insertion of the connector in the collar. The termination may be assembled and installed in the field.

A method of assembling a cable termination assembly, includes positioning at least part of a cable and connector in a hollow collar, and inserting a retainer clip through an opening in a wall of the collar in position to block withdrawing of the connector from one end of the collar. Additionally, a resilient cover is positioned on the collar to provide a watertight connection with another device with which the cable termination assembly may be attached. The method may be carried out to assemble and install the cable termination assembly in the field.

19 Claims, 10 Drawing Sheets

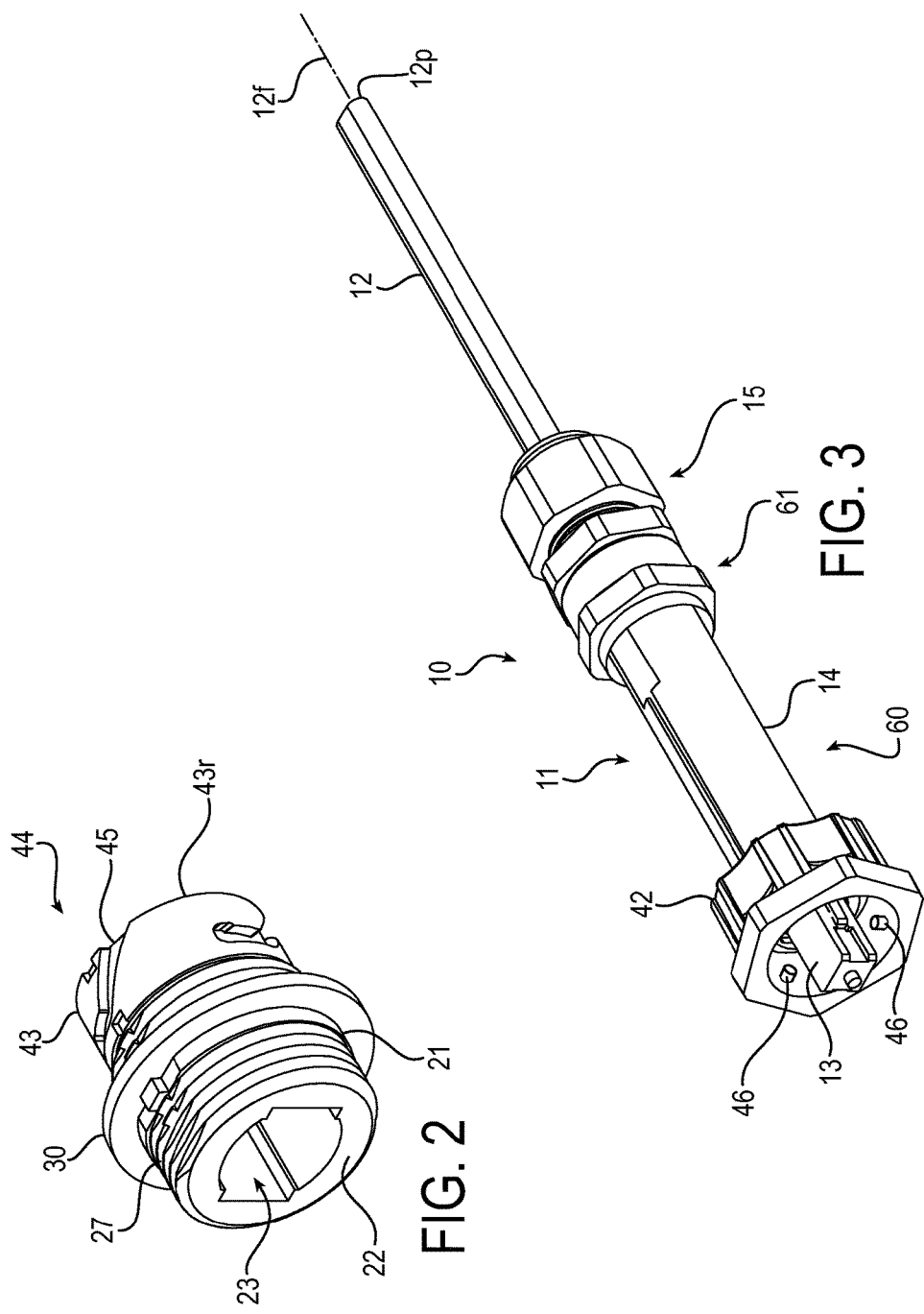

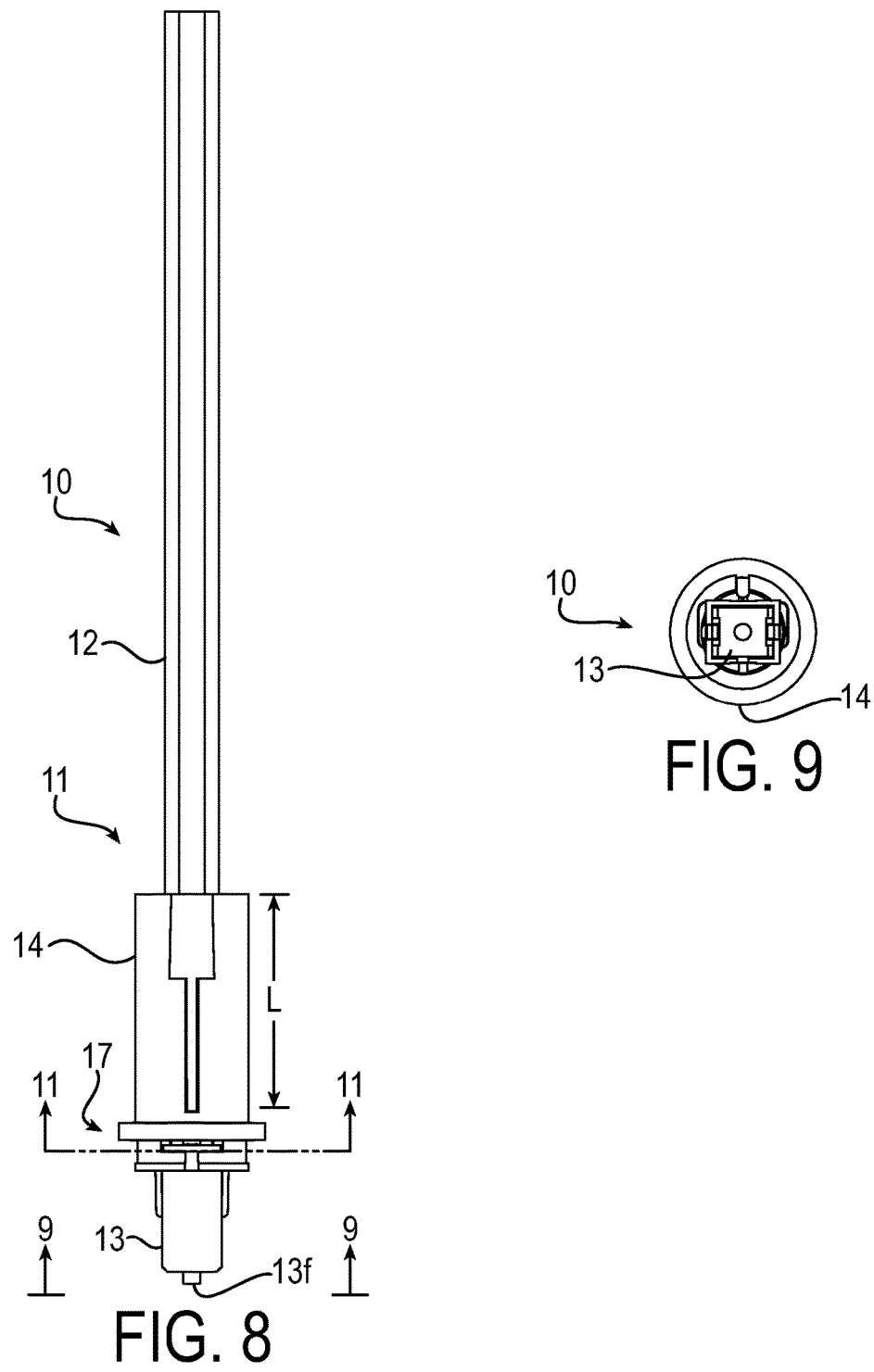

FIELD INSTALLABLE CABLE TERMINATION SYSTEM AND METHOD

PRIORITY CLAIM

This is a non-provisional patent application claiming priority from U.S. Provisional Patent Application No. 62/317,021, filed Apr. 1, 2016.

TECHNICAL FIELD

This disclosure relates generally to cable termination systems and methods and, more particularly, to cable termination connector systems and methods for terminating fiber optic drop cables conveniently in the field.

BACKGROUND

In the past connector systems for fiber optic cables, such as, for example, those fiber optic cables used as drop cables, typically were assembled to the fiber optic cables at the factory to make a cable termination assembly. A drop cable may be, for example, a line that connects a terminal of a distribution cable or system to a subscriber's premises or may be, for example, a line that connects a terminal of a distribution system at a premises to another system or subsystem also at the premises. Such a line, e.g., a fiber optic line or cable, may carry telephone service, cable TV, a link to a network, and so on. An exemplary distribution system may include a distribution box, panel or the like in which one or more distribution cables are terminated and at which connections are provided from the one or more distribution cables to one or more drop cables, for example.

SUMMARY

Providing capability for field installation and assembling of drop cables, e.g., fiber optic drop cables, would be advantageous and would reduce or avoid the need for factory assembling of fiber optic cables and connectors (also referred to herein as optical connectors). Factory assembling, for example, may disadvantageously require a purchaser to have to specify the desired length of fiber optic cable when placing an order. However, when that fiber optic cable and connector would be installed for use, the installer may find that a different length fiber optic cable may be preferred and may have to cut and/or to trash some fiber optic cable or even the entire termination mechanism/connector used with the pre-ordered cable.

For example, field installation may be at or near a job site or may be at some other location other than a factory. Being able to do assembly, installation and/or repair of a cable termination assembly in the field may reduce wasted material, wasted labor and travel time or shipping time (e.g., to and from a factory), and expense. The field installation technique in some instances may be carried out at a factory, as well, e.g., to repair a termination (sometimes referred to as cable termination or as connector), a cable, or a cable termination assembly (e.g., that includes the cable and the termination), to facilitate making a termination or cable termination assembly for a special order circumstance without having to shut down or slow down a main assembly line, etc. A cable termination assembly that includes an optical connector and a fiber optic cable, e.g., a cable that includes one or more optical fibers, usually includes a housing or support structure that holds the connector and cable in relation to each other to avoid interrupting optical continuity between them and/or to avoid damaging the connector, cable and optical continuity thereof. In this disclosure the fiber optic cable may be, for example, a drop cable or may be another type of optical cable. The fiber optic cable may include one or more fiber optic members and an external protective jacket or cover, and the fiber optic cable also may include one or more other components, e.g., insulators and so on. The terms fiber optic cable, optical cable, drop cable, cable and so on may be used interchangeably and equivalently herein or as apparent from context. The terms connector and optical connector also may be used interchangeably and equivalently herein, as will be apparent from the description context.

In a fiber optic cable termination assembly, the fiber optic connector and cable may be mounted in or relative to a housing or support structure to facilitate protecting the fiber optic connector and cable, especially where they are attached to each other and also to facilitate attaching or mounting the cable termination assembly to another device, e.g., to a distribution box, distribution or control panel or the like, such as to a bulkhead, wall, surface, etc., of a distribution box, distribution or control panel or the like. Mounting of the fiber optic connector and cable in such housing or support structure typically also was done in part or entirely at a factory process. It would be desirable to facilitate such mounting in the field.

Briefly, this disclosure provides apparatus and method wherein a connector and fiber optic cable are mounted with respect to a housing or support structure as part of a cable termination assembly for terminating the fiber optic cable and, for example, facilitating carrying out such terminating in the field, e.g., during installing or preparing to install the fiber optic cable and connector for use, e.g., to couple signals with respect to another device.

With the above and following in mind, one aspect of this disclosure relates to a termination for a fiber optic cable, including an optical connector for a fiber optic member, a collar having a hollow interior in which at least part of the optical connector is positionable, and a retainer mechanism including a retaining clip positionable with respect to the collar at a location to block exiting of the optical connector from the collar.

Optionally, the retainer mechanism further includes an opening in a wall of the collar configured to receive the retaining clip in position to block exiting of the optical connector from the collar past the retaining clip.

Optionally, the optical connector includes an interference surface, and the retaining clip is positionable with respect to the collar to interfere with the interference surface to block exiting of the optical connector from the collar.

Optionally, the optical connector includes a connector housing including a connector portion configured to conduct optical signals, and a holder portion configured to hold to the connector housing.

Optionally, the termination further includes a resilient member on the collar to provide a watertight seal with another device to which the termination may be connected.

Optionally, the resilient member is positionable on the collar over the retaining clip that is positioned through a wall of the collar to block exiting of the retaining clip from its position with respect to the collar.

Optionally, the termination further includes a stop on the collar configured to guide positioning of the resilient member on the collar.

Optionally, the stop includes a flange at least partly circumscribing the exterior surface of the collar.

Optionally, the resilient member is waterproof and is cooperative with the stop, with a portion of an exterior wall of the collar and with a further member urging the resilient cover toward the stop to provide a watertight and/or weathertight connection between the termination and such further member.

Optionally, the retaining clip includes a base and a protrusion positionable to protrude into the hollow interior of the collar to block withdrawing of the optical connector from the collar.

Optionally, the collar is cylindrical, and the hollow interior is of a size to receive at least part of the optical connector at one end and to receive in the hollow interior a fiber optic cable.

Optionally, retaining clip is positionable through a wall of the collar near said one end of the collar.

Optionally, the opening in a wall of the collar is a slot-like opening having respective interior walls, wherein the retaining clip has a base and a protrusion positionable to protrude through the slot-like opening into the hollow interior of the collar to block withdrawing of the optical connector from the collar, and wherein the retaining clip includes a pair of arms positionable into respective portions of the slot-like opening to engage respective interior walls of the slot-like opening to resist exiting of the retainer clip from the slot-like opening.

Optionally, at least one arm includes a hook-like protrusion configured for positioning beneath a respective interior wall of the slot-like opening to block withdrawal of the clip.

Optionally, the termination further includes a fiber optic member attached to the optical connector.

Optionally, the termination further includes a strain relief configured to block transferring to the optical connector strain that is applied to the fiber optic member from outside the hollow interior of the collar.

According to another aspect, a method of assembling a cable termination assembly, includes positioning at least part of a cable and connector in a hollow collar, and inserting a retainer clip through an opening in a wall of the collar in position to block withdrawing of the connector from one end of the collar.

Optionally, said positioning includes urging the connector toward a stop in the hollow collar, whereby the connector is maintained in position with respect to the hollow collar by both the stop and the retainer clip.

Optionally, the method further includes placing a resilient member on the collar and urging the resilient member to engage a flange-like surface of the collar.

Optionally the method further includes attaching the cable termination assembly to another device while urging the cable termination assembly toward the other device to at least partly compress the resilient member between the another device and the flange-like surface to provide a substantially watertight seal between the cable termination assembly and the another device.

These and other aspects and features of this disclosure will be clear with reference to the following description and drawings, in which embodiments are disclosed to indicate some ways for implementing the principles of the present disclosure. However, it will be appreciated that the scope of the present disclosure is not limited thereto. On the contrary, the present disclosure includes any change, modification and equivalent falling within the scope, spirit and connotation of the accompanying claims.

The term "include/comprise" herein refers to the existence of feature, element, step or component, not excluding the existence or addition of one or more other features, elements, steps, components or combinations thereof.

Various aspects of the present disclosure can be better understood with reference to the following drawings. The components in the drawings are not necessarily drafted to scale, and the emphasis is laid upon clearly illustrating the principles of the present disclosure. For the convenience of illustrating and describing some parts of the present disclosure, corresponding parts in the drawings may be enlarged in size, e.g., enlarged to be shown larger than the case in an exemplary device actually made according to the present disclosure, relative to other parts. Components and features depicted in one drawing or embodiment of the present disclosure may be combined with components and features depicted in one or more other drawings or embodiments. Moreover, in the drawings, the same reference numerals designate corresponding parts throughout the drawings and may be used to designate the same or similar parts, and primed reference numerals may be used to designate parts that are similar to those designated by the same unprimed reference numeral.

BRIEF DESCRIPTION OF THE DRAWINGS

The included drawings are used for providing further understandings of the present disclosure, and they constitute a part of the Specification. Those drawings illustrate the preferred embodiments of the present disclosure and elaborate the principles of the present disclosure together with the descriptions.

In the drawings:

FIG. 2 is an isometric view of a bulkhead fitting for attaching a cable termination assembly to a distribution box, distribution panel or the like;

FIG. 3 is an isometric view of an assembled cable termination assembly, showing an optical connector, optical cable and support or housing;

FIG. 8 is a top plan view of a portion of the cable termination assembly showing the fiber optic cable, collar and connector;

FIGS. 9 and 10 are front end views of the cable termination looking in the direction of the arrows 9-9 of FIG. 8, FIG. 10 being enlarged relative to FIGS. 8 and 9;

DESCRIPTION

Figure 1:
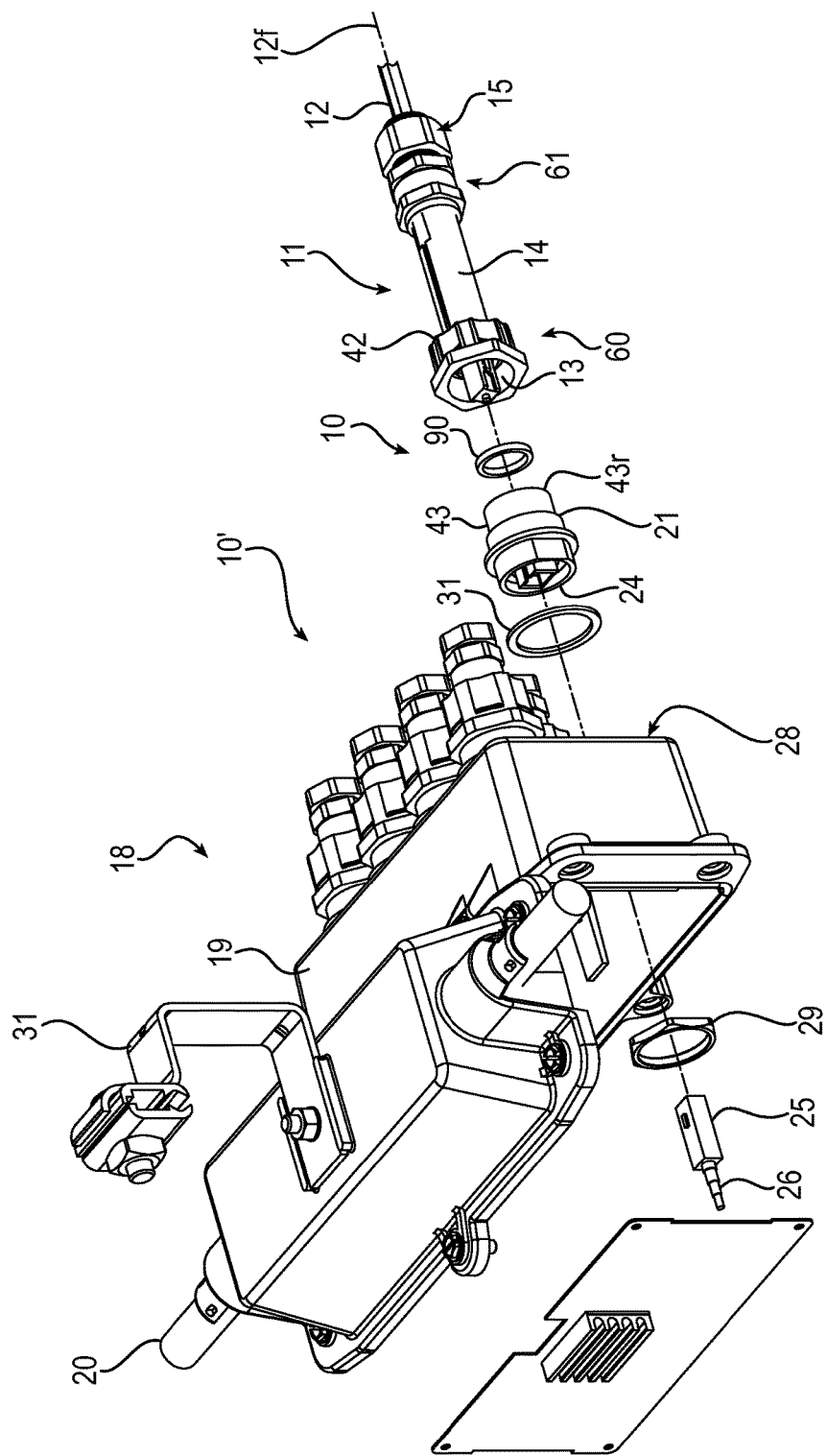
FIG. 1 is an isometric view of a distribution system including a distribution box to which a number of fiber optic cable termination assemblies are attached, one of the cable termination assemblies being shown in exploded view.

Referring in detail to the drawings, and initially to FIG. 1, a number of optical cable termination assemblies 10 are illustrated. The cable termination assembly 10 shown in the foreground is in exploded view and is described in detail below and other cable termination assemblies are shown in partial view for illustrative purposes, as there may be more or fewer cable termination assemblies than shown, and they may be the same as or different from the foreground cable termination assembly 10.

Cable termination assembly 10, which sometimes is referred to below as "termination assembly" for brevity, includes a cable termination 11 and a cable 12. An example of the cable 12 is an optical cable, also referred to as a fiber optic cable, one example of which is a drop cable. In the description below the drop cable is a single fiber drop cable—e.g., it has only a single fiber optic member that carries or transmits optical signals. An exemplary fiber optic member 12$f$ is shown schematically in the drawings. However, it will be appreciated that this disclosure is not limited to such cable, and the cable may be another type of cable. Also, the cable termination 11 includes an optical connector 13, for example, one referred to as an SC connector. Also, it will be appreciated that this disclosure is not limited to such connector, and the connector may be another type of connector that currently exists, e.g., an LC connector or other connectors, or connectors that may come into existence in the future. The various parts of the cable termination assembly 10, may be configured to accommodate other types of connectors and cables. The cable termination 11 also includes housing 14 (sometimes referred to as collar) in which the connector 13 is positionable, e.g., at least part way into the housing, whereby the housing 14 holds, supports and protects at least part of the connector. The termination assembly 10 includes the termination 11, the cable 12 having a fiber optic member 12$f$ attached to the connector 13, and a strain relief 15, which tends to prevent the cable 12 from being pulled out from the housing.

Figure 10:
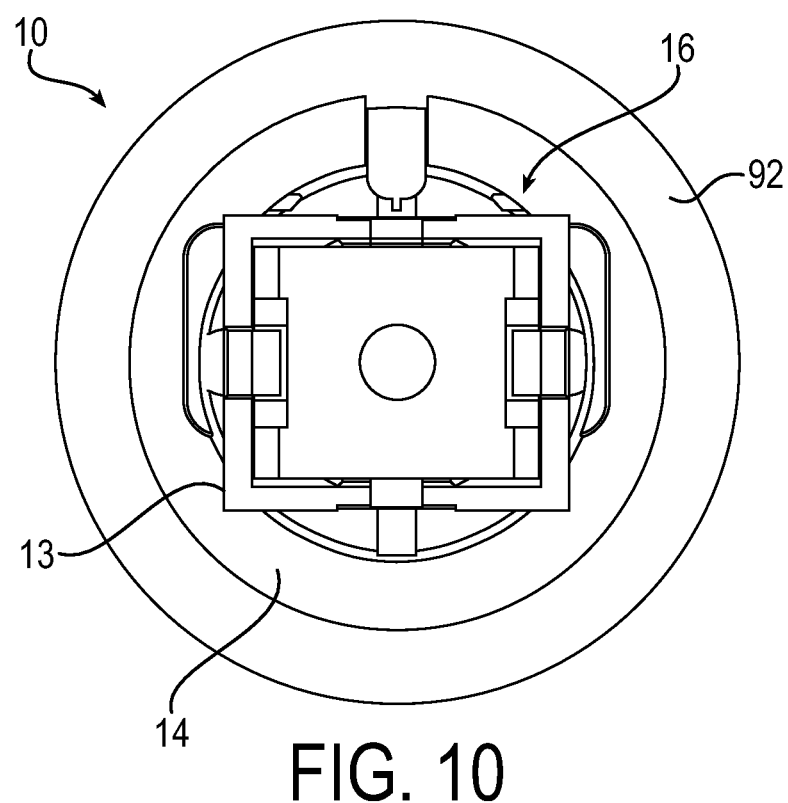

As is seen in several of FIGS. 1-14 of the drawings, the connector 13 of the cable termination assembly 10 is positioned with respect to the housing (collar) 14. For example, as illustrated, the housing 14 may be in the form of a hollow tubular member or collar in which at least part of the connector 13 is positioned. As is described further below, the collar 14 includes an insertion limiting mechanism 16 (seen in FIGS. 10, 11 and 13) that facilitates positioning of the connector 13 with respect to the collar, e.g., to limit or to restrict the length or distance that the connector is inserted into the collar. Moreover, the cable termination assembly 10 includes a retainer mechanism 17 (seen in FIGS. 4, 5, 6, 8 and 11) that prevents or blocks the connector 13 from exiting the collar 14, e.g., by being pulled out or falling out of the collar, after the connector has been positioned in the collar. In a sense the retainer mechanism 17 is a securement mechanism that helps to secure the connector 13 in the collar. Part of the cable 12 is positioned in the collar 14 and the fiber optic member 12$f$ is coupled to the connector 13 to conduct or couple optical signals between the fiber optic member and the connector. The actual connection or coupling of the connector 13 and fiber optic member 12$f$ may be located in the collar 14 and, therefore, is protected from damage by force, environment, etc. from outside the collar, while the connector is maintained in position in the collar by the insertion limiting mechanism 16 and the retainer mechanism 17 and the strain relief 15 prevents externally applied strain to the cable from affecting the cable that is within the collar 14.

As is described further below, the retainer mechanism 17 includes a retaining clip that presses into the collar or housing 14 that has a slot-like opening or groove. The clip retains the connector 13 at least partly in the collar by locking in the groove in front of part of the connector to block exiting of the connector from the collar. A resilient O-ring functions to hold the retaining clip in place, to provide a watertight seal function, and to provide a resilient or spring effect to keep a locking collar tightly secured to an external device, e.g., to a bulkhead fitting or the like, when the locking collar is attached to the external device to hold the collar to the external device. The connector 13 includes a connector portion 13$c$, which provides a signal coupling function, and a holder portion 13$h$. The holder portion fits over the connector portion and in cooperation with the retaining clip retains the connector in position in or with respect to the collar. The holder portion also prevents both rotation and front to back movement of the connector relative to the collar—these in cooperation with features of the collar, as will be described further below.

Turning to FIG. 1, the termination assemblies 10 are connected in a distribution system 18, which includes a connections housing or box 19 in which or at which connections for coupling signals may be made between and/or among one or more termination assemblies and/or with a main distribution cable 20 containing one or more optical and/or electrical conductors for carrying respective signals. A distribution panel (not shown) or the like may be substituted for and/or used in connection with the box 19—reference to box herein similarly may include distribution panel and the like. At or in the box 19, distribution panel or the like optical signals of respective termination assemblies 10 and/or the main distribution cable 20 may be coupled to another termination assembly or to signal conductor(s) of the main distribution cable, for example, or to some other device (not shown). Also or alternatively, apparatus may be included in or associated with the box 19 to perform conversion of optical signals to electrical signals and/or vice versa; and the converted signals may be coupled to respective cable termination assemblies 10, to the distribution cable, or to other connections that are not shown in FIG. 1.

Referring to FIGS. 1 and 2 an illustrated bulkhead fitting 21 is an example of a fitting for attaching a termination assembly 10 to the box 19 and to optical or other circuitry or other components in the box. The fitting 21 includes a housing 22, e.g., made of a plastic or other material. Electrically non-conductive material may be preferred. In the interior 23 of the fitting 21 is a connector 24 (seen in FIG. 1 but omitted for clarity of illustration in FIG. 2) of a type that can bridge between two connectors, such as, for example, the SC connector 13 of a termination assembly 10 and another SC connector 25 that is in the box 19. The SC connector 25 may be connected, for example, to a fiber optic cable 26 or other cable in the box 19. The fitting 21 has a screw thread 27 at one end, which may be positioned through an opening (not shown) in an attachment wall or bulkhead wall 28 of the housing 19. A bulkhead adapter nut 29 inside the housing 19 may be placed on and tightened on the screw thread 27 to draw the fitting 21 securely to the bulkhead wall 28 to mount the fitting to the housing. As the nut 29 is tightened, a flange 30 is pulled to the bulkhead wall 28 and compresses a bulkhead adapter seal 31 (FIG. 1), such as a resilient O-ring or washer, against the bulkhead wall 28 to seal the junction or mechanical connection of the fitting 21 and box 19.

A support bracket 31 may mount the box 19 for use at some location, e.g., inside or outside a building, at a distribution pole (e.g., power pole, telephone pole or the like), and so on. Such location may be referred to as "the field", e.g., a location that is where the distribution system 18 is in use as compared to in a factory at which the cable termination assemblies 10 may be manufactured. The distribution system 18 also or alternatively may be located and used in such a factory. Although this disclosure describes the cable termination assemblies 10 including components and methods suited to facilitate being manufactured, assembled and/or installed in the field, the cable termination assemblies also may be manufactured, assembled and/or installed at a factory.

Figure 4:
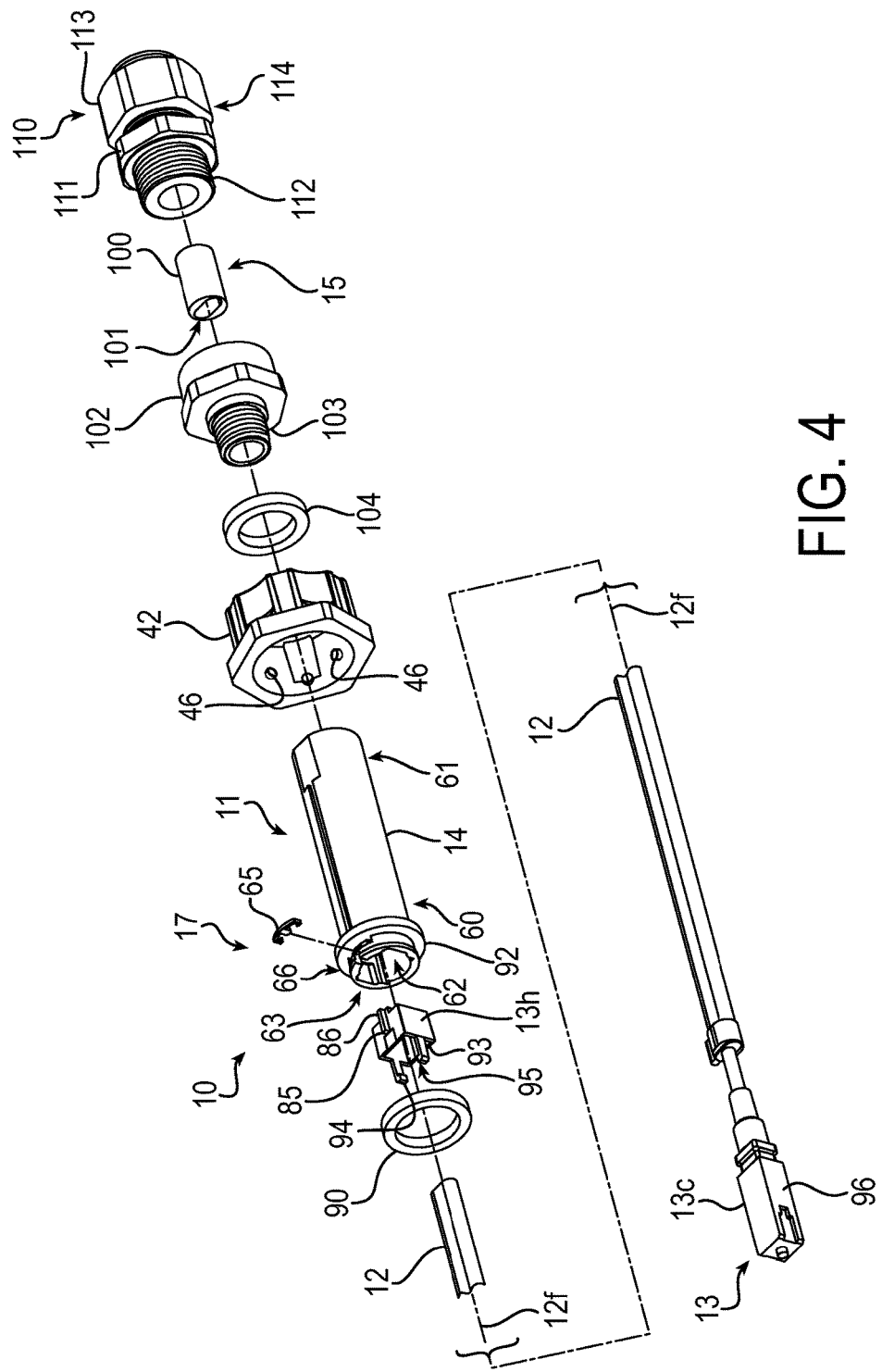
FIG. 4 is an exploded isometric view of the cable termination assembly of FIGS. 1 and 3.

As is seen in FIGS. 1, 2 and 4, the termination assembly 10 includes a locking collar or attaching collar 42 that attaches to an attachment portion 43 of the bulkhead fitting 21. As is described below, the termination assembly 10 may be positioned with respect to the bulkhead fitting 21, e.g., to position the connector 13 in alignment with and to urge it into engagement with the connector 24 that is in the bulkhead fitting. The locking collar 42 may be attached securely to the attachment portion 43 of the bulkhead fitting 21. For example, the locking collar 42 and attachment portion 43 may be secured by mating threads (not shown), by mating bayonet attachment mechanism, or by some other attachment mechanism (not shown). For example, in FIGS. 2 and 3 a bayonet attachment mechanism 44 includes a slot arrangement 45 in the attachment portion 43 and one or more protruding tabs 46 at the interior of the locking collar 42 to mate with the slot arrangement.

Turning to FIG. 3, the cable termination assembly 10 is shown in assembled relation of the cable 12 and cable termination 11. For convenience of description and to provide a relative directional reference, the end of the cable termination assembly 10 facing the box 19 may be referred to herein as the forward end, and the other end may be referred to as the rearward end. The cable 12 may include, for example, a fiber optic member 12*f* enclosed within a protective jacket 12*p*. An optical connector 13, e.g., an SC connector, LC connector or some other type of optical connector, as may be available currently or may become available in the future, is attached to the fiber optic member to couple optical signals therebetween and to provide for coupling optical signals via the connector with respect to another device, such as, for example, the connectors 24 and 25 (both shown in FIG. 1). The locking collar 42 is at one end 60 (sometimes referred to as the forward end or connector end) of an elongate hollow cylindrical collar 14, which provides mounting, support, and protection from damage for the connector 13 and cable 12 and their connection in the cable termination assembly 10, and the cable strain relief 15 is at the other end 61 of the collar 14 (sometimes referred to as the rearward end, cable end or strain relief end). As was mentioned above, the locking collar 42 may be used to attach the termination assembly 10 to a bulkhead fitting 21. The strain relief 15 resists pulling of the cable 12 out from the termination assembly 10, e.g., toward the right-hand direction relative to the illustrations in the drawings.

Figure 5:
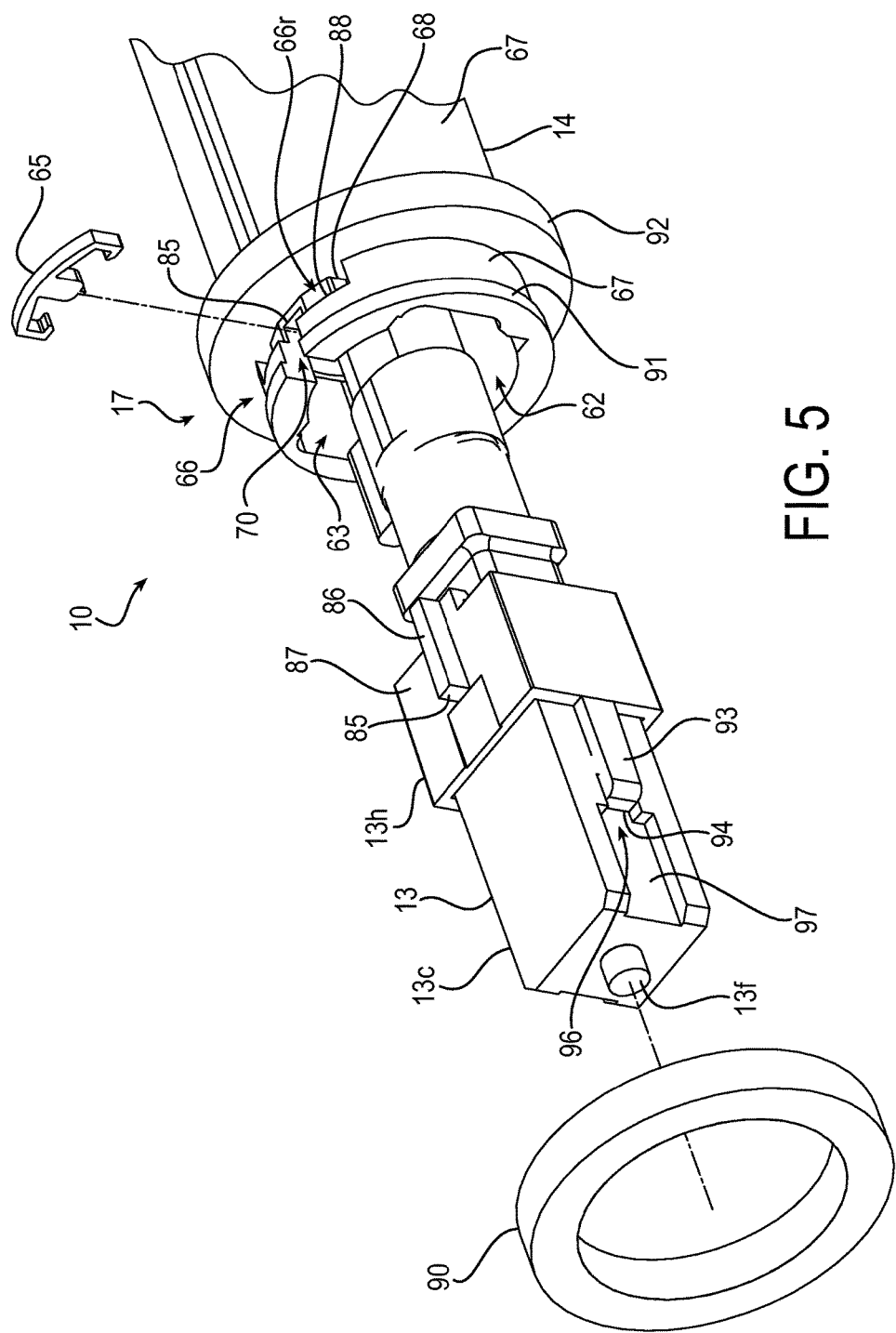
FIG. 5 is an enlarged fragmentary partly exploded isometric view of the connector end of the cable termination assembly of FIGS. 1, 3 and 4.
Figure 6:
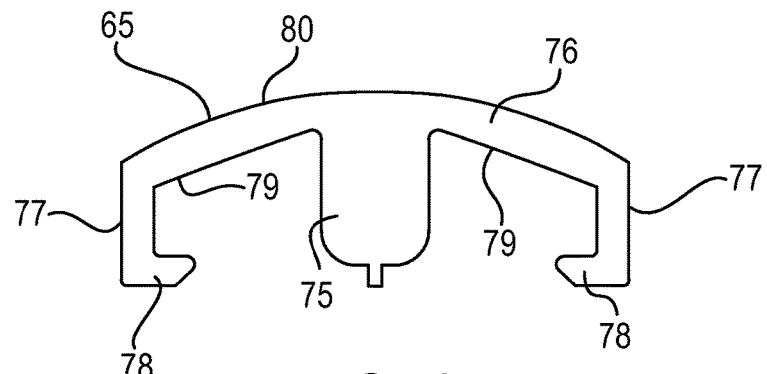
FIG. 6 is a plan view of a retaining clip of the cable termination assembly.
Figure 7:
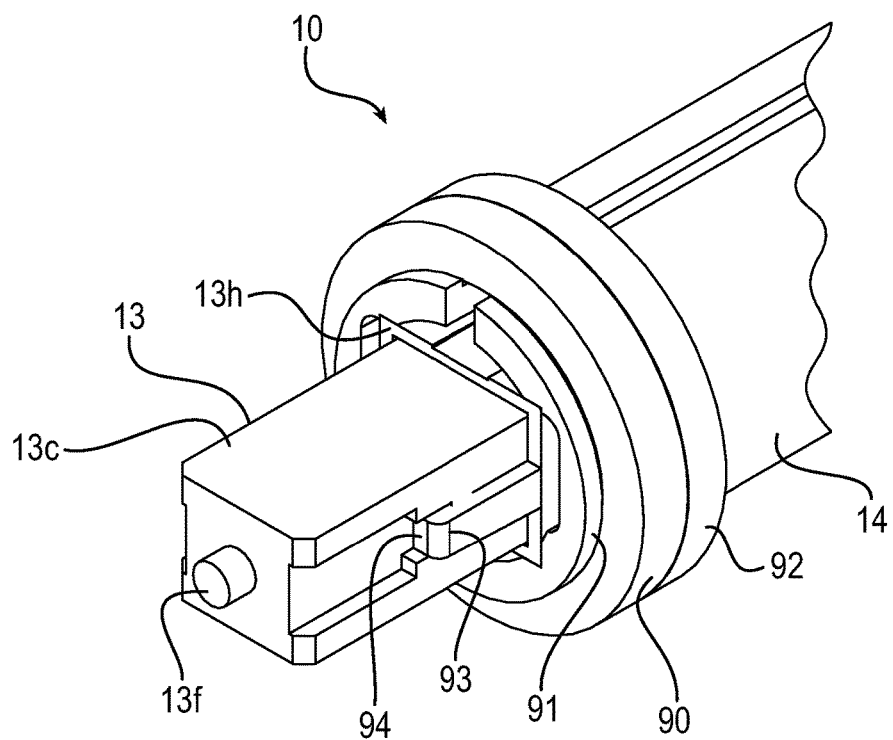
FIG. 7 is an enlarged fragmentary isometric view of a connector assembled with respect to a housing or support of the cable termination assembly.

Turning to FIGS. 4-7, the cable termination assembly 10 is illustrated in further detail. The connector 13 includes a connector portion 13*c* and a holder portion 13*h*. The connector portion 13*c* is connected to the fiber optic member 12*f* and provides optical connection to an optical ferule 13*f*, which is used to couple optical signals between the optical connector and another device, e.g., to the optical connector 24 in the bulkhead fitting 21. The holder portion 13*h* holds to the connector portion 13*c* and facilitates mounting the connector in the collar 14. The collar 14 has a hollow interior 62, one end 60 (the connector end or forward end) of which is configured to match generally the shape and dimensions of the connector 13, for example, the holder portion 13*h*, as is seen in FIGS. 5 and 7. At the other end 61 (rearward end) of the collar 14 is the strain relief 15.

Referring also to FIGS. 6-13, features of the insertion limiting mechanism (also referred to as stop) 16 and the retainer mechanism 17 are shown. These mechanisms 16 and 17 cooperate with the connector 13 and collar 14 positioning and retaining the connector with respect to the collar. The stop 16 in the hollow interior 62 of the collar 14 restricts or limits the distance or length of insertion of the connector 13 into the collar, e.g., to a positioning as is shown in FIG. 7, where the connector is shown already inserted to a maximum extent into the hollow interior of the collar.

Figure 11:
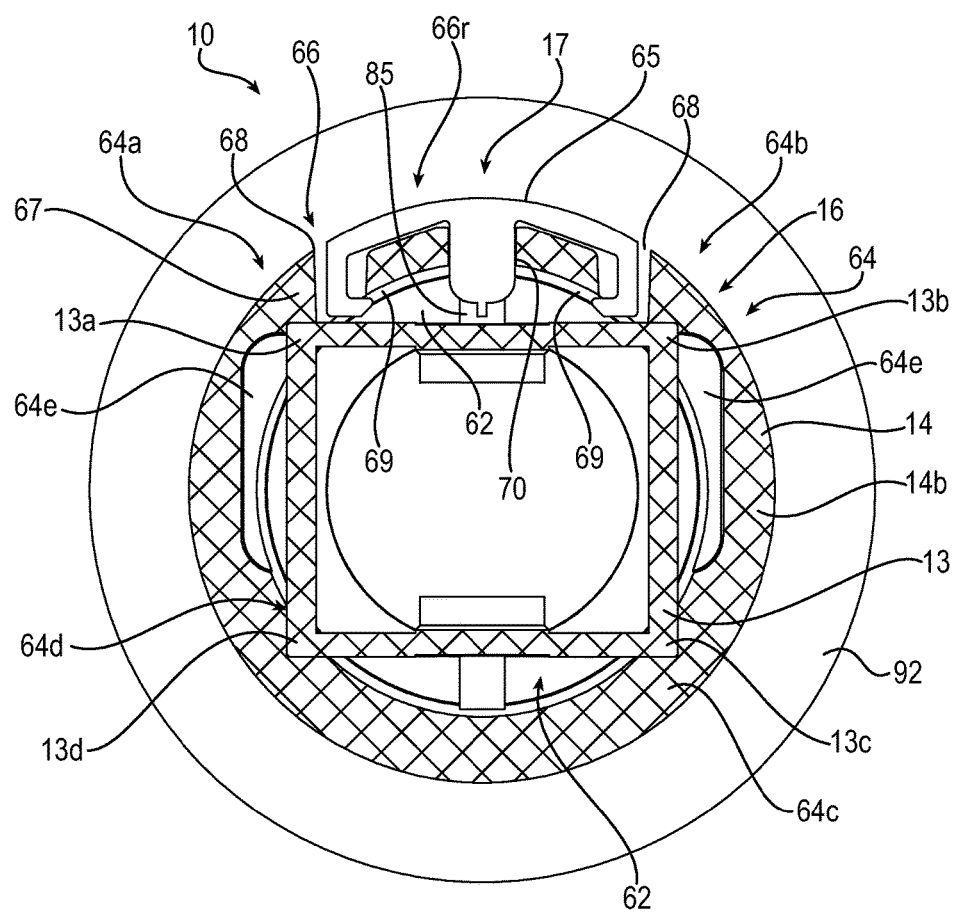
FIG. 11 is a section view of the cable termination looking in the direction of the arrows 11-11 of FIG. 8.
Figure 12:
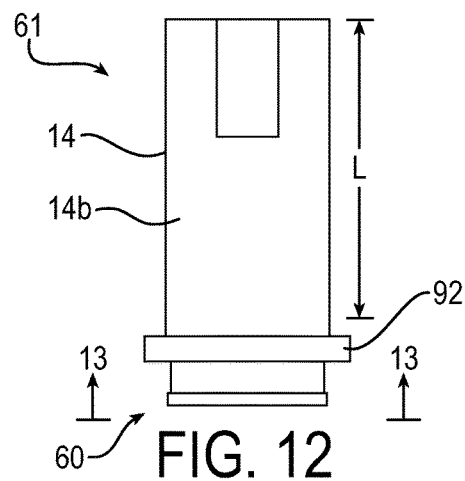
FIG. 12 is a top plan view of the housing or collar of the cable termination.
Figure 13:
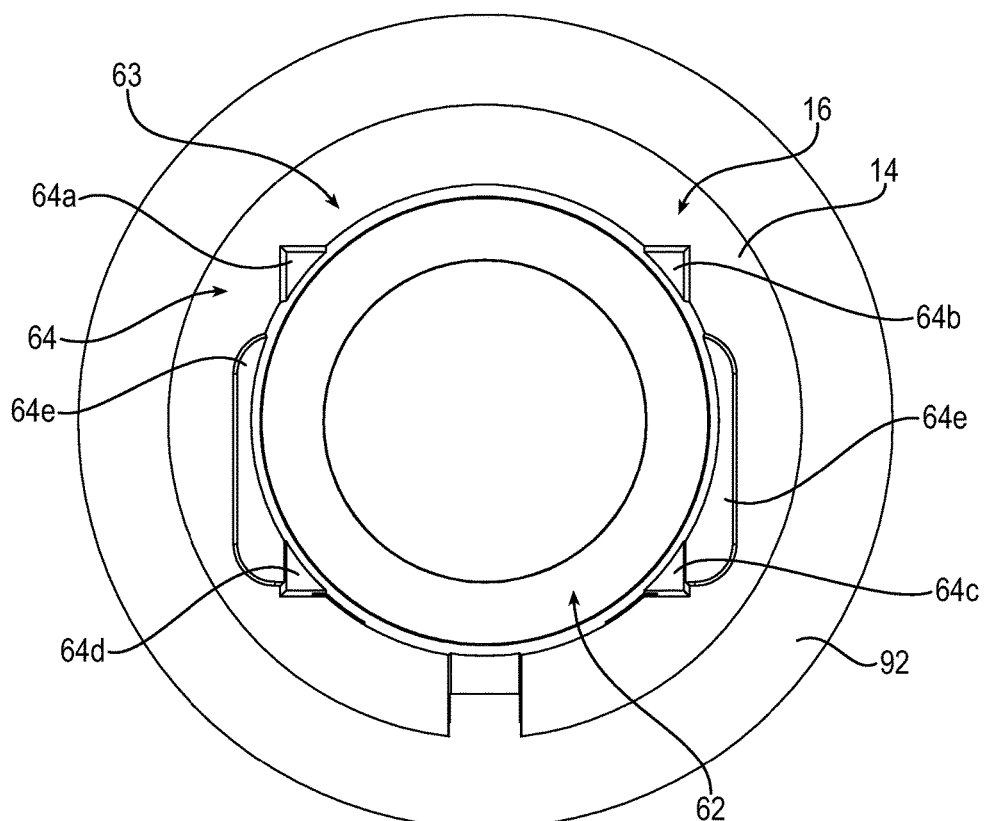
FIG. 13 is a front view of the housing or collar of the cable termination looking in the direction of the arrows 13-13 of FIG. 12.

The insertion limiting mechanism 16 stops, limits or restricts the insertion of the connector 13 at the proper position in the hollow interior 62 of the collar 14. This is accomplished by a change in cross-section of the collar 14 at a point or location in the hollow interior 62 where the inserted end of the connector 13 is intended to be stopped. In FIGS. 11 and 13 the change in cross-section in the collar is shown. In the section view of FIG. 11 the change in cross section of the collar 14 is shown with a connector 13 in the collar; and for clarity the illustration of the collar 14 in FIG. 13 is shown as a front elevation view without any other parts in position in the collar.

As is shown in FIGS. 8-13, a length L of the hollow interior 62 of the collar 14 from the back or rear end 61 toward the forward end 60 is, for example, generally of circular cross section or of other cross section adequate to pass the cable 12 along that length. That hollow circular cross section interior 62 is surrounded by the body 14*b* of the collar 14. At the forward end 60 the cross section of the hollow interior 62 is configured or is of a configuration that corresponds to a form factor of the connector 13 to provide a space 63 to permit the connector to be inserted into the hollow interior. However, there is a change in cross section area of the hollow interior 62 where the forward end of the circular cross section space of length L meets the space 63 and this change in cross section area provides a surface 64 (FIG. 13) in the hollow interior 62. The surface 64 is the insertion limiting mechanism or stop 16 that interferes with or engages the connector 13 to limit, restrict or stop the connector 13 from passing further into the hollow interior 62 beyond the surface or stop 64.

As is seen in FIGS. 9, 10, 11 and 13, the surface or stop 64 is formed by four portions 64*a*, 64*b*, 64*c* and 64*d* that are as lands, which interfere with four respective corners of the connector 13*a*, 13*b*, 13*c* and 13*d*. This arrangement and shape of the four stops or lands 64*a*-64*d* and the four corners 13*a*-13*d* are configured and coordinated for use with an SC type connector to provide for proper positioning of the connector in the collar.

Also as seen in FIGS. 9, 10 11 and 13 there may be different or additional cross section changes between the circular cross section hollow interior along length L, on the one hand, and space that is of a form factor coordinated with the form factor of a different connector than the mentioned SC type connector. For example, a cross section change that provides surfaces or stops 64*e* also is shown. The surfaces or stops 64e are of a configuration coordinated with the form factor of an LC connector. Of course, other shapes and configurations may be used to provide the function of positioning a connector in the hollow interior 62 of the collar 14.

Alternatively, the stop 16 may be a surface or protrusion that protrudes inwardly from the inner surface of the interior of the collar 14. For example, the stop 16 may be simply one or more protruding tabs or pin-like member(s), may be a reduced cross sectional area of the collar compared to a larger cross sectional area at the forward end of the collar at which the optical connector 13 is inserted into the collar, may be a relatively thin (e.g., thin in the axial direction of the collar 14) internal flange-like surface or wall protruding from the internal wall of the collar and extending partly or fully about the hollow interior 62, etc.

The insertion limiting mechanism (stop) 16 restricts or limits the extent that the connector 13 may be inserted into the hollow interior of the collar and also allows or provides space in the hollow interior 62 for the cable 12 to pass through the collar between the connection of the cable to the connector at or near the connector end 60 to the cable end (also referred to as rear, rearward or back end or the like) 61 of the collar 14 where the strain relief 15 is located.

With the connector 13 positioned such that at least part is inserted in the hollow interior 62 of the collar 14 at the connector end 60, the retainer mechanism 17 prevents that part of the connector 13 from exiting the hollow interior from the connector end, e.g., blocks or prevents the connector from falling out or from being pulled out from the collar 14. For example, when the cable termination assembly is pulled away from the connector 24 that is in the bulkhead fitting 21 a strain may be applied to the connector 13 tending to pull the connector 13 out from the collar 14; the retainer mechanism 17 prevents the connector 13 from exiting the collar from the forward end 60 of the collar, e.g., being pulled out from the collar.

It will be appreciated that the stop 16 limits or restricts the distance that the connector 13 may be inserted into the hollow interior 62 of the collar 14 and the retainer mechanism 17 blocks exiting of the connector from the connector end 60 of the collar, e.g., preventing the connector from falling out or being pulled out. Therefore, the stop 16 and retainer mechanism 17 help to assure desired positioning of the connector 13 in the collar 14.

Referring to FIGS. 5, 6 and 11, the retainer mechanism 17 includes a retaining clip 65 (sometimes referred to herein as clip) and an opening 66 in the collar 14. The clip 65 is positionable in the opening 66 in the collar 14 to block exiting of the optical connector 13 from the collar past the clip. The opening 66 may be a slot or slot-like recess or gap 66r (sometimes referred to herein as opening, slot-like opening or slot) in the collar wall 67. A pair of through portions or retainer openings 68 at or near ends of the slot-like recess 66r extend through the collar wall 67 into the hollow interior 62 of the collar. Adjacent where the through portions 68 open into the hollow interior 62 are surface areas or lands 69, which cooperate with the clip 65 to hold the clip in position in the collar 14, as is described further below. An open space 70 through the collar wall 67 is cooperative with a protrusion, stop or surface 75 (FIG. 6) (also sometimes referred to as protruding stop surface) of the clip 65 to pass the stop 75 into the hollow interior 62 in position to block the connector 13 from exiting the collar, as also is described further below.

As is shown in FIG. 6, the retaining clip 65 includes the protrusion or protruding stop surface 75 that extends from a base 76. Arms 77 extend out from the base 76 and terminate at respective fastening or securement ends, such as, for example, the illustrated hook-like or barb-like tips 78 at their respective ends. The clip 65 may be made by stamping it from sheet metal material or it may be otherwise formed, e.g., by molding. The parts of the clip 65 may be coplanar, e.g., it may be basically flat, although if desired it may be of some other shape. The clip may be of relatively strong material, e.g., metal or strong plastic, as it functions to block the connector 13 from exiting from the collar 14.

The clip 65 is of a size and shape to fit in the opening 66 at the forward end (connector end) 60 of the collar 14. For example, the protruding base 76 fits in the slot-like recess or groove 66r, and the stop surface 75 fits into and through the through opening or space 70 of opening 66 into the hollow interior 62 of the collar 14. Also, the arms 77 fit in the retainer openings 68. The arms 77 may be resilient to resiliently urge the hooks or barbs 78 into engagement with respective walls of retainer openings 68. The hooks or barbs 78 slide along such walls as the clip 65 is pressed or otherwise urged into and through respective retainer openings 68 such that after the hooks or barbs pass the lands 69, the arms spring back to locate the hooks or barbs directly beneath respective lands. The hooks or barbs tend 78 tend to lock or hold at or beneath the lands 69 to hold the clip 65 in position in the opening 66. Therefore, the clip will not fall out of the opening 66, and the clip will remain in position in the collar to block the connector 13 from exiting the collar. Alternatively, the hooks or barbs 78 may dig into respective walls of the retainer openings 68 to tend to hold the clip 65 in place without the arms 77 reaching the hollow interior 62. Further, with the clip 65 positioned in the opening 66, the bottom surface or edge 79 of the base 76 engages or is closely in position adjacent the floor of the gap or groove 66r so that the clip base is recessed in the gap or groove 66r such that top edge 80 of the clip is about at the level of the exterior of the collar wall 67, e.g., coplanar or approximately coplanar in a circular sense with the collar wall 67.

Thus, it will be appreciated that the retaining clip 65 is pressed into the collar 14 at the slot-like opening 66 such that stop surface 75 protrudes into the hollow interior 62 of the collar 14 and part of the base 76 of the retaining clip cooperates with walls forming the gap or groove 66r so that the clip retains the connector 13 in the collar, as is described further below. The arms 77 in the retainer openings 68 tend to lock the retaining clip in place in the collar 14.

Referring to FIGS. 4, 5 and 11, the optical connector 13 includes an interference surface 85. The interference surface 85 is at the forward end of a raised platform 86 that extends above the plane of one surface 87 of the connector holder portion 13h. The platform 86 and interference surface 85 may be considered a securement tab that cooperates with the protrusion 75 of the retaining clip to tend to hold the connector 13 in position with respect to the collar 14 to prevent the connector from exiting the collar.

In assembling the cable termination assembly 10, the connector 13, which already is attached to the fiber optic member 12f of the cable 12, is inserted at the connector end 60 into the hollow interior 62 of the collar 14 such that the interference surface 85 is inserted past or beyond the slot-like opening 66 toward the stop 16. For example, such inserting may be sufficient to cause the connector 13 to engage the stop 16 inside the collar 14. The cable 12 extends through the collar 14 and exits the rearward end 61 of the collar. With the connector so inserted into the collar, the retaining clip 65 then may be inserted into the opening 66 in position such that the protrusion 75 is aligned with the interference surface 85 so as to block exiting of the connector from the collar. Thus, the retaining clip 65 is positionable with respect to the collar 14, e.g., in the opening 66, such that the protrusion 75 passes into the hollow interior 62 of the collar in front of the interference surface 85, to engage the interference surface 85 if a force were applied to the optical connector 13 tending to pull it out from the connector end 60 of the collar 14, thereby to block exiting of the optical connector from the collar. By preventing the connector 13 from being pulled out from the collar 14 also prevents the cable 12, which is attached to the connector 13, from being pulled out of the collar.

In FIG. 5 a clip stop wall 88 is shown. The clip stop wall 88 is at the forward side of the recess 66r of the slot-like opening 66. The clip stop wall 88 and forward facing surface of the clip base 76 face each other, when the clip 65 is in position in the slot-like opening 66, so that if a force were applied to the optical connector 13 tending to pull it forward out from the collar, the protrusion 75 would block exiting of the optical connector. The clip stop wall 88 blocks or supports the clip 65 from being pulled forward out of the slot-like opening 66. Interaction between walls of the retainer openings 68 and the clip arms 77 further buttress against forward movement of the clip in response to such a pulling forward force being applied to the optical connector 13.

A resilient washer, O-ring, or the like 90 (sometimes referred to as resilient member or sealing member, but for convenience referred to below collectively as washer or sealing member) is of size and shape such that it can be resiliently stretched to fit over the collar 14 across a rim portion 91 at the forward end of the collar wall 67 into position on the collar wall. A flange or wall 92 on the outside of the collar 14 provides a back stop, support or guide to help locate the washer 90 on the collar so that the washer conveniently may be positioned on the collar between the rim portion 91 and flange 92. For example, the washer 90 may be pushed over the rim portion 91 toward engagement with the flange 92, thus guiding the washer into position on the collar 14. After the washer 90 has been positioned to circumscribe the collar wall 67 between the rim portion 91 and flange 92, the stretch may be released so that the washer 90 engages and holds to the collar wall. The final positioning of the washer 90 with respect to the flange 92 is seen in FIG. 7. The O-ring or washer 90 also may act as a spring to help keep the locking cap 42 in position and secured to the bulkhead fitting 21. The washer 90 also may provide a watertight seal over the opening 66 and clip 65.

The flange 92 also is cooperative with the locking cap 42 in mounting or attaching the cable termination assembly 10 to the bulkhead fitting 21 (FIG. 1). To attach the cable termination assembly 10 to the bulkhead fitting, the cable termination assembly is positioned such that the connector portion 13c of the optical connector 13 is aligned with the connector 24 in the bulkhead fitting 21 and then the optical connector 13 is pushed into the connector 24. As the optical connector 13 is pushed into the connector 33 to make connection therewith, e.g., mechanical connection and/or optical connection, the forward end 60 of the collar 14 with the washer 90 is pressed against the rearward facing edge 43r of the attachment portion 43 of the bulkhead fitting 21. With the resilient washer 90 engaged with the edge 43r, the locking cap 42 may be slid forward along the external surface of the collar 14 to engage the locking cap. The locking cap 42 then may be tightened to the bulkhead fitting 21 by a securement feature, such as a bayonet connection therebetween, a threaded connection therebetween, and so on. During such tightening of the locking cap 42 to the bulkhead fitting, the interior wall of the locking cap presses against the flange 92 tending to urge both the flange 92 and the edge 43r to bear against the washer 90 to provide a watertight (and/or weathertight—watertight and weathertight are used equivalently and interchangeably herein) seal between the cable termination assembly 10 and the bulkhead fitting 21. For example, the washer 90 may be compressed to some extent to provide such watertight seal characteristic. To enhance such watertight seal, the washer 90 may be waterproof.

The position of the washer 90 on the collar 14 may be such that it is over at least part of the retaining clip 65, which is positioned in the slot-like opening 66 in the collar. The washer 90 may cover the opening 66 and block exiting of the retaining clip from the opening 66, e.g., to avoid falling out or being pulled or forced out of the opening.

The flange 92 may be an integral part of the collar 14, e.g., the collar may be molded of plastic or of other material and the flange 92 may be molded or formed as an integral part of the major extent of the collar. As is shown, the collar is a linear cylinder, for example, and the flange 92 circumscribes the collar about the exterior surface of the collar.

As is seen in FIGS. 4, 5 and 7, the optical connector 13 includes a housing that includes a holder portion 13h and a connector portion 13c. Those portions are held together by holder portion arms 93 that have protruding tabs 94. The connector portion 13c and holder portion 13h may be slid together such that part of the connector portion 13c is positioned in a hollow interior space 95 (FIG. 4) of the holder portion 13h. The holder portion arms 93 are flexible and resilient to resiliently urge the tabs 94 to engage a surface 96 at the end of a respective recess 97 in the exterior surface at two sides of the connector portion 13c housing thereby to hold the connector portion 13c and holder portion 13h together. Two of such arms 93 are seen in FIG. 4. In the assembled optical connector 13 isometric views of FIGS. 5 and 7 only one of those arms 93 and one of the recess 97 are seen. The holder portion 13h is of a configuration to fit over a standard SC fiber optic connector 13c to retain it in the collar 14 by the retaining clip 65, as is described above, e.g., the protrusion 75 cooperates with the interference surface 85 to block exiting of the connector from the collar. Moreover, the shape or configuration of the entrance to the open interior 62 of the of the collar 14 at the forward or connector end 60 is configured to cooperate with the shape (form factor) of the holder portion 13h of the connector 13 to prevent the holder portion from rotating relative to the collar 14 and relative to the cable 12 and the fiber optic member 12f of the cable. The configuration of the holder portion 13h of the connector 13 and the configuration of the connector portion 13c are cooperative such that the connector portion does not rotate relative to the holder portion or move axially or longitudinally (e.g., front to back) relative to the collar 14, and, therefore, does not rotate or move axially or longitudinally relative to the cable or fiber optic member.

Figure 14:
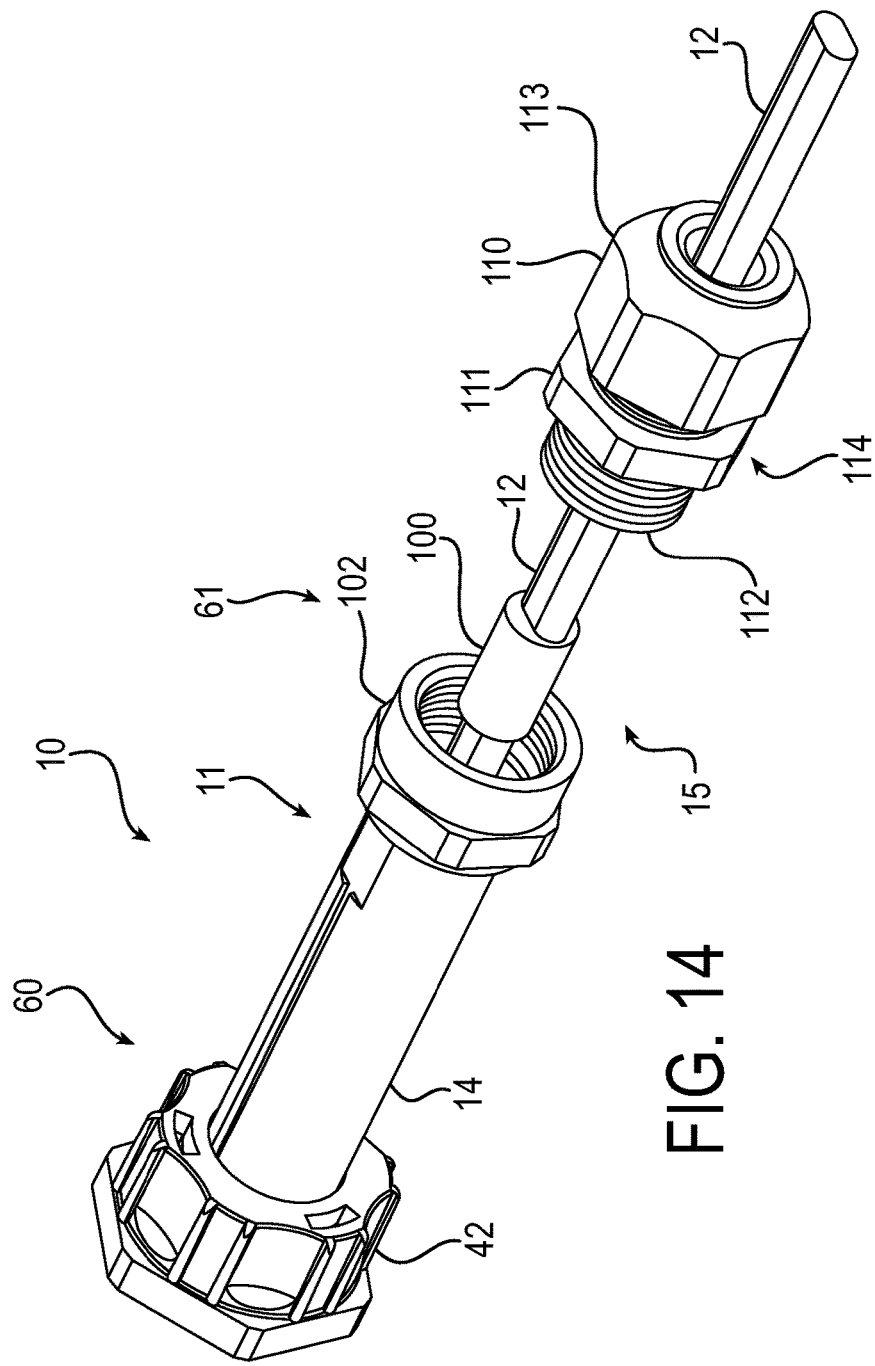
FIG. 14 is an enlarged partly exploded isometric view of the cable termination assembly featuring the strain relief thereof.

Referring to FIGS. 4 and 14, the strain relief 15 at the rearward end 61 of the collar 14 includes a flexible, resilient sleeve 100. The sleeve 100 has a hollow interior 101 that is configured to conform to the external shape of the cable 12. The sleeve 100 is slid on the cable to a location near the rearward end 61 of the collar 14. For example, the sleeve can be slid on the cable 12 at the forward end of the cable before the cable is attached to the connector 13 or can be slid on the cable from the rearward end of the cable. The cable 12 may be of a somewhat flat or elliptical cross section, and the sleeve is configured to present a circular exterior shape that conveniently and effectively can be compressed in and as part of the strain relief.

The strain relief 15 also includes an adapter fitting 102 that screws into the rearward end 61 of the collar 14 at a threaded connection 103 together with a sealing washer or O-ring 104 (seen in FIG. 4), which avoids or blocks leakage, e.g., a watertight connection.

A two-part compression fitting 110 fits over the cable 12. The forward part 111 of the compression fitting 110 may be slid along the cable 12 to a position over the sleeve. The forward part 111 may be attached to the adapter fitting 102 at a threaded connection 112. The adapter fitting 102 adapts the collar 14 and the compression fitting 110 of the strain relief 15 to be attached to each other.

The forward part 111 of the compression fitting includes a number of resilient fingers or other resilient member(s) or part(s) that are not shown. Those resilient fingers or member(s) may be positioned to engage the sleeve 100. The circular cross section of the sleeve 100 facilitates uniform and secure engagement by the resilient fingers, or resilient member(s) or part(s). The rearward part 113 of the compression fitting 110 may be screwed onto the forward part 111 at a threaded connection 114. The rearward part 113 has a hollow interior area of a shape, e.g., tapered, to cooperate with the resilient fingers or resilient member(s) or part(s) to urge them to compress against the sleeve 100 urging the sleeve against the cable 12 as the rearward part is screwed onto the forward part 111.

Thus, when the rearward part 113 of the compression fitting 104 is screwed on the forward part 111, the rearward part causes resilient fingers or resilient member(s) or part(s) to apply compression force against the sleeve to urge the sleeve in close, conforming resilient engagement with the cable 12. Such compression force against the sleeve 100 also causes close, conforming resilient engagement of the sleeve with walls of one or both of the fitting parts 111, 113 and, as is mentioned above, with the resilient fingers or resilient member(s) or part(s). Such engagements of the sleeve with the cable and of the sleeve with the fitting 110 provides a compression and frictional force on the cable 12 tending to resist or to oppose strain or force that may be applied to the cable that would try to pull the cable from the cable termination assembly 10. Further, the close, conforming resilient engagements mentioned provide a watertight seal for the interior of the cable termination assembly at the rearward end 61 of the collar 14.

The preferred embodiments of the present disclosure are described above with reference to the drawings. Many features and advantages of those embodiments are apparent from the detailed Specification, thus the accompanied claims intend to cover all such features and advantages of those embodiments which fall within the spirit, scope and connotation thereof. The embodiments of the present disclosure are not limited to the exact structures and operations as illustrated and described, and they cover all suitable modifications and equivalents falling within the scope of the claims.

The invention claimed is:

1. A termination for a fiber optic cable, comprising
an optical connector for a fiber optic member,
a collar having a hollow interior in which at least part of the optical connector is positionable, and
a retainer mechanism including a retaining clip positionable with respect to the collar at a location to block exiting of the optical connector from the collar;
the retainer mechanism further comprising an opening in a wall of the collar configured to receive the retaining clip in position to block exiting of the optical connector from the collar past the retaining clip;
wherein the opening in the collar projects radially through the collar wall from an outer perimeter of the collar wall toward the hollow interior, and
wherein the retainer clip is configured for insertion radially inwardly into the opening in the collar wall.

2. The termination of claim 1, wherein the optical connector includes an interference surface, and the retaining clip is positionable with respect to the collar to interfere with the interference surface to block exiting of the optical connector from the collar.

3. The termination of claim 1, wherein the optical connector includes a connector housing including a connector portion configured to conduct optical signals, and a holder portion configured to hold to the connector housing.

4. The termination of claim 1, further comprising a resilient member on the collar to provide a watertight seal with another device to which the termination may be connected.

5. The termination of claim 4, wherein the resilient member is positionable on the collar over the retaining clip that is positioned through a wall of the collar to block exiting of the retaining clip from its position with respect to the collar.

6. A termination for a fiber optic cable, comprising
an optical connector for a fiber optic member,
a collar having a hollow interior in which at least part of the optical connector is positionable, and
a retainer mechanism including a retaining clip positionable with respect to the collar at a location to block exiting of the optical connector from the collar;
further comprising a resilient member on the collar to provide a watertight seal with another device to which the termination may be connected
further comprising a stop on the collar configured to guide positioning of the resilient member on the collar.

7. The termination of claim 6, wherein the stop comprises a flange at least partly circumscribing the exterior surface of the collar.

8. The termination of claim 4, wherein the resilient member is waterproof and is cooperative with the stop, with a portion of an exterior wall of the collar and with a further member urging the resilient cover toward the stop to provide a watertight connection between the termination and such further member.

9. The termination of claim 1, wherein the retaining clip includes a base and a protrusion positionable to protrude into the hollow interior of the collar to block withdrawing of the optical connector from the collar.

10. The termination of claim 1, wherein the collar is cylindrical, and the hollow interior is of a size to receive at least part of the optical connector at one end and to receive in the hollow interior a fiber optic cable.

11. The termination of claim 10, wherein the retaining clip is positionable through a wall of the collar near said one end of the collar.

12. A termination for a fiber optic cable, comprising
an optical connector for a fiber optic member,
a collar having a hollow interior in which at least part of the optical connector is positionable, and
a retainer mechanism including a retaining clip positionable with respect to the collar at a location to block exiting of the optical connector from the collar;

the retainer mechanism further comprising an opening in a wall of the collar configured to receive the retaining clip in position to block exiting of the optical connector from the collar past the retaining clip;

wherein the opening in a wall of the collar is a slot-like opening having respective interior walls, wherein the retaining clip has a base and a protrusion positionable to protrude through the slot-like opening into the hollow interior of the collar to block withdrawing of the optical connector from the collar, and wherein the retaining clip includes a pair of arms positionable into respective portions of the slot-like opening to engage respective interior walls of the slot-like opening to resist exiting of the retainer clip from the slot-like opening.

13. The termination of claim 12, wherein at least one arm includes a hook-like protrusion configured to press toward a respective interior wall of the slot-like opening.

14. The termination of claim 1, further comprising a fiber optic member attached to the optical connector.

15. The termination of claim 14, further comprising a strain relief configured to block transferring to the optical connector of strain that is applied to the fiber optic member from outside the hollow interior of the collar.

16. A method of assembling a cable termination assembly, comprising
positioning at least part of a cable and connector in a hollow collar, and
inserting a retainer clip through an opening in a wall of the collar in position to block withdrawing of the connector from one end of the collar;
wherein the opening in the collar projects radially through the collar wall from an outer perimeter of the collar wall toward the hollow interior, and
wherein the inserting comprises inserting the retainer clip radially inwardly into the opening in the collar wall.

17. A method of assembling a cable termination assembly, comprising
positioning at least part of a cable and connector in a hollow collar, and
inserting a retainer clip through an opening in a wall of the collar in position to block withdrawing of the connector from one end of the collar;
said positioning comprising urging the connector toward a stop in the hollow collar, whereby the connector is maintained in position with respect to the hollow collar by both the stop and the retainer clip.

18. The method of claim 16, further comprising placing a resilient member on the collar and urging the resilient member to engage a flange-like surface of the collar.

19. A method of assembling a cable termination assembly, comprising
positioning at least part of a cable and connector in a hollow collar, and
inserting a retainer clip through an opening in a wall of the collar in position to block withdrawing of the connector from one end of the collar;
further comprising attaching the cable termination assembly to another device while urging the cable termination assembly toward the other device to at least partly compress the resilient member between the another device and the flange-like surface to provide a substantially watertight seal between the cable termination assembly and the another device.

* * * * *